US011045744B2

United States Patent
Jansen et al.

(10) Patent No.: US 11,045,744 B2
(45) Date of Patent: Jun. 29, 2021

(54) WASH COLUMN APPARATUS WITH STATIC GRID ELEMENT FOR USE IN A SUSPENSION CRYSTALLIZATION PROCESS

(71) Applicant: Sulzer Management AG, Winterthur (CH)

(72) Inventors: Halbe Jansen, Eschlikon (CH); Johannes Jansen, Bergeijk (NL)

(73) Assignee: SULZER MANAGEMENT AG, Winterthur (CH)

( * ) Notice: Subject to any disclaimer, the term of this patent is extended or adjusted under 35 U.S.C. 154(b) by 2 days.

(21) Appl. No.: 16/332,261

(22) PCT Filed: Sep. 6, 2017

(86) PCT No.: PCT/EP2017/072362
§ 371 (c)(1),
(2) Date: Mar. 11, 2019

(87) PCT Pub. No.: WO2018/046545
PCT Pub. Date: Mar. 15, 2018

(65) Prior Publication Data
US 2019/0201808 A1  Jul. 4, 2019

(30) Foreign Application Priority Data
Sep. 12, 2016 (EP) .................................... 16188348

(51) Int. Cl.
*B01D 9/00* (2006.01)
(52) U.S. Cl.
CPC .......... *B01D 9/0045* (2013.01); *B01D 9/005* (2013.01); *B01D 9/0013* (2013.01); *B01D 9/0059* (2013.01)

(58) Field of Classification Search
None
See application file for complete search history.

(56) References Cited

U.S. PATENT DOCUMENTS 3,777,892 A    12/1973  Thijssen
3,872,009 A  *  3/1975  Thijssen ............ B01D 11/0223
                                                            210/178

(Continued)

FOREIGN PATENT DOCUMENTS

DE    10242746 A1   3/2004
EP     1256367 A2  11/2002

*Primary Examiner* — Jelitza M Perez
(74) *Attorney, Agent, or Firm* — Global IP Counselors, LLP

(57) ABSTRACT

A wash column apparatus for the use in a suspension crystallization process for separating crystals from a crystal suspension mixture includes a cylindrical vessel including a piston with a piston head including a filter and a piston rod, movable in the cylindrical vessel, an inlet for supplying a crystal suspension mixture into the cylindrical vessel, an outlet for discharging mother liquor from the cylindrical vessel, an outlet for discharging crystals or crystal melt from the cylindrical vessel, a circulation conduit for circulating melt arranged outside the vessel, in communication with the wash chamber, a static grid element arranged in the wash chamber for restricting movement of the crystal bed and for directing the wash liquid entering into the cylindrical vessel from the circulation conduit so as to homogeneously distribute it over the entire cross-section of the wash column.

12 Claims, 9 Drawing Sheets

(56) References Cited

U.S. PATENT DOCUMENTS 3,877,009 A     4/1975   Kanie et al.
6,719,954 B2   4/2004   Jansen
8,252,120 B2   8/2012   Nordhoff et al.

* cited by examiner

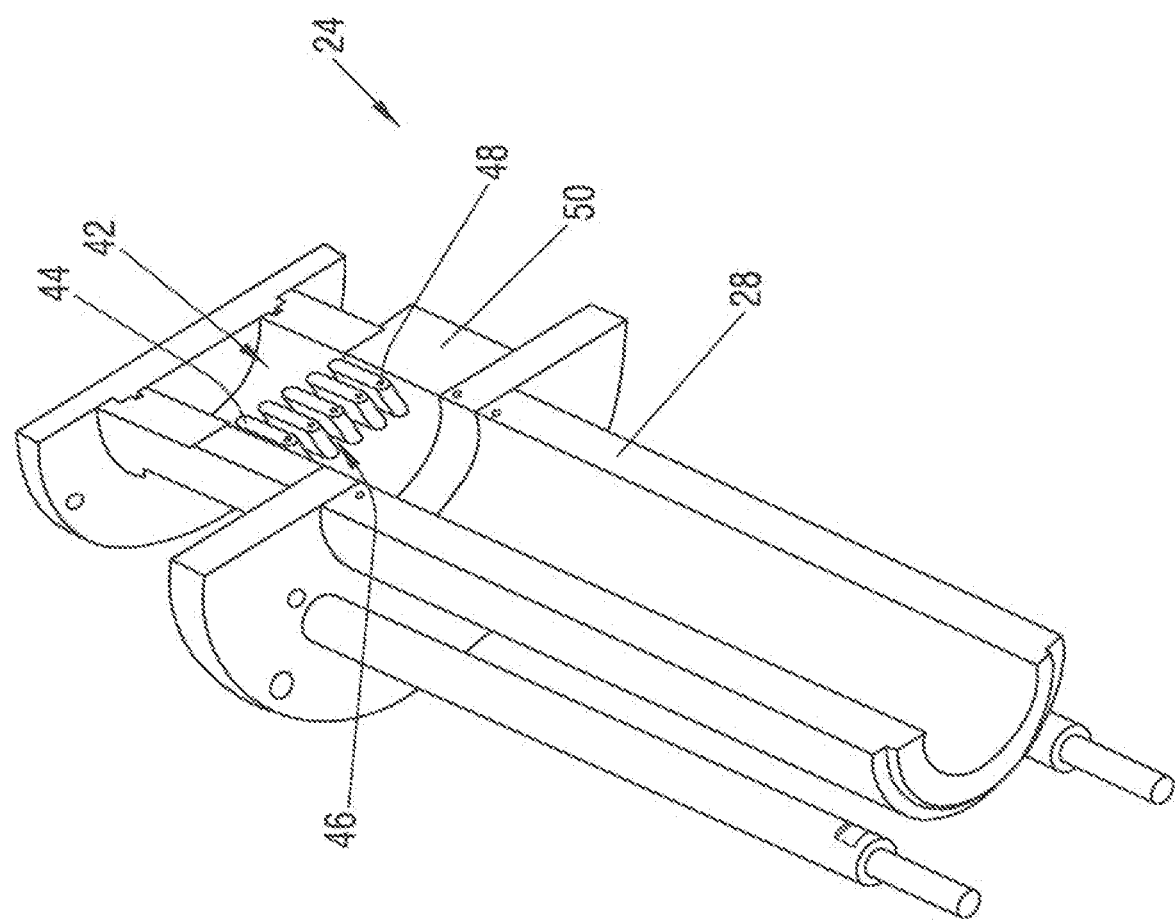

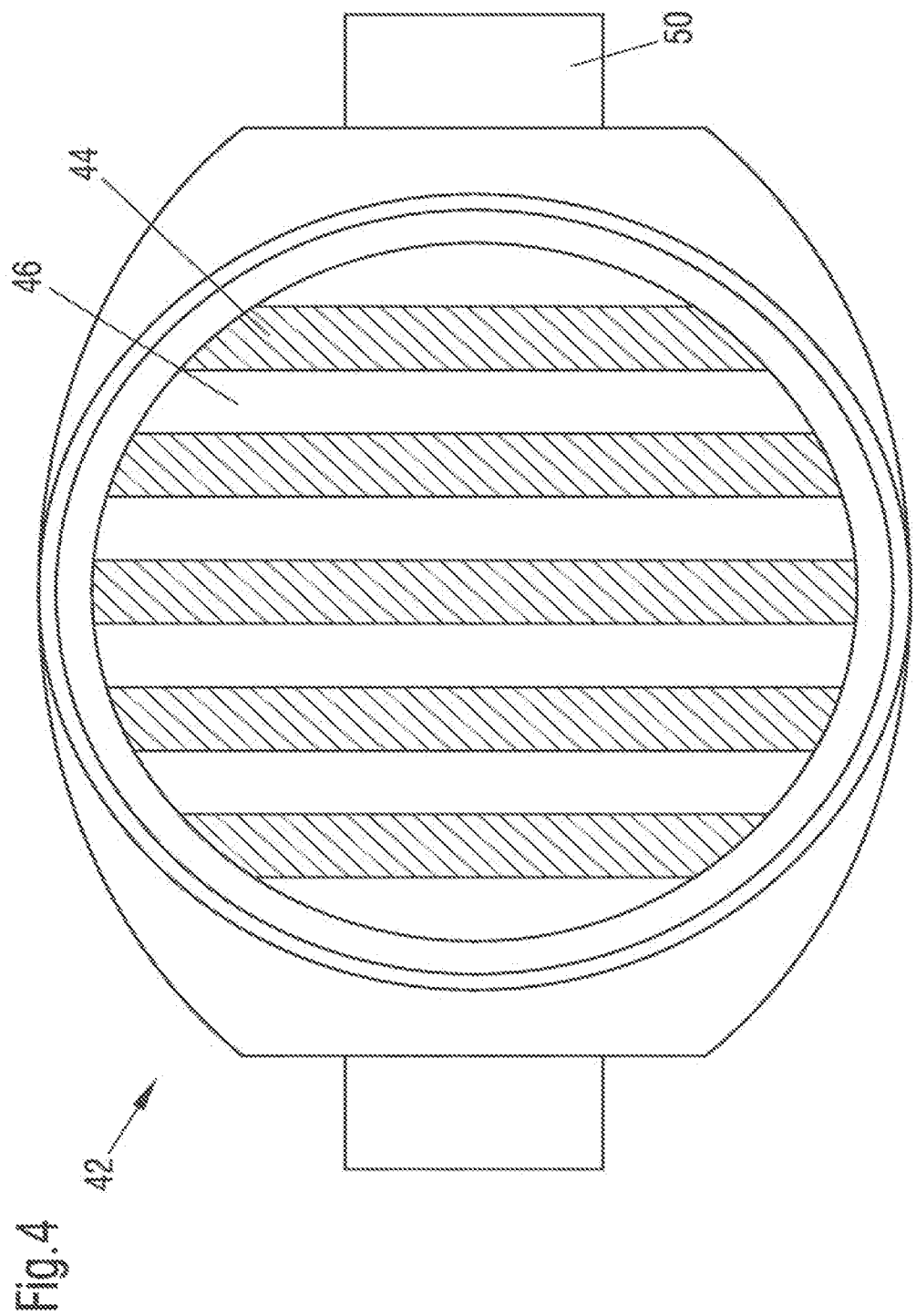

Fig.5A
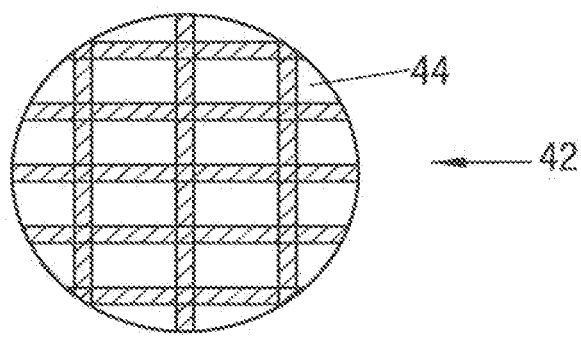
Fig.5B  Fig.5C  Fig.5D  Fig. 5E
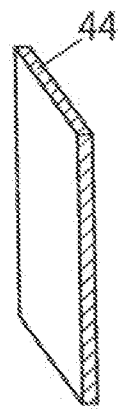 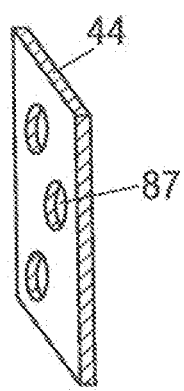 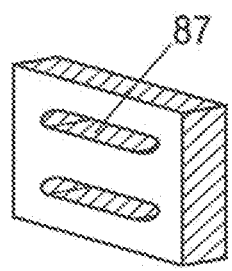 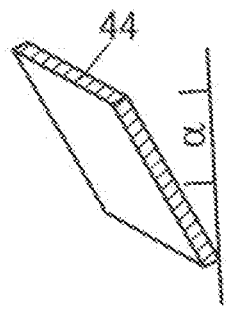
Fig.5F  Fig.5G
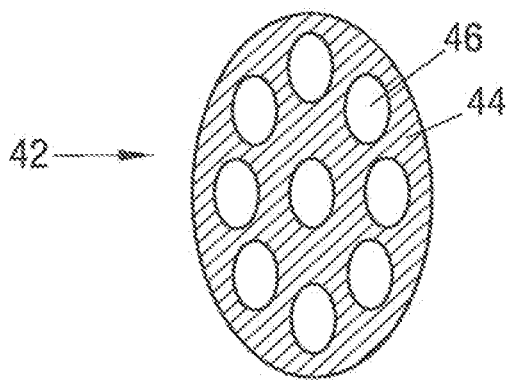 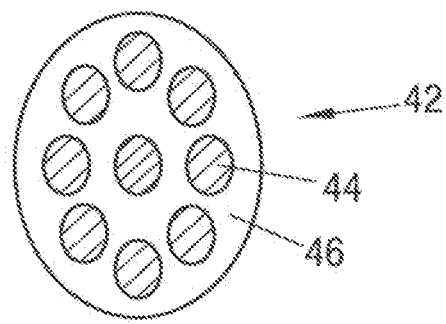

WASH COLUMN APPARATUS WITH STATIC GRID ELEMENT FOR USE IN A SUSPENSION CRYSTALLIZATION PROCESS

CROSS-REFERENCE TO RELATED APPLICATION

This application is a U.S. National Stage application of International Application No. PCT/EP2017/072362, filed Sep. 6, 2017, which claims priority to European Patent Application No. 16188348.3, filed Sep. 12, 2016, the contents of each of which are hereby incorporated herein by reference.

BACKGROUND

Field of Invention

The present invention relates to a wash column apparatus for use in a suspension crystallization process for separating crystals from a crystal suspension mixture composed of crystals and mother liquor. Moreover, the present invention relates to a suspension crystallization plant comprising such a wash column apparatus. In addition, the present invention relates to a method for separating crystals from a crystal suspension mixture composed of crystals and mother liquor making use of such a wash column.

Background of the Invention

Crystallization is besides distillation and extraction one of the most important industrial processes for separating and purifying a substance from a mixture, in which the substance to be purified is contained in a high, medium or even low concentration. More specifically, crystals enriched in the substance to be separated and purified form during crystallization from a solution or melt, provided that the substance to be separated and purified has in pure form a higher freezing temperature than the mixture of this substance with the other substances included in the solution or melt, respectively. Thus, a suspension—which is also called crystal suspension mixture or slurry—is formed, which consists of crystals from the component to be separated and a concentrated solution called mother liquor. Because crystallization has in comparison with particularly distillation the advantages of being able to be used for the separation and purification of heat-sensitive substances and of being much more energy efficient, crystallization processes gain increasing importance in industry.

Suspension crystallization plants comprise two major blocks, namely firstly at least one crystallization block for producing crystals and secondly at least one separation block for separating the crystals from the mother liquor. While the crystallization block typically comprises at least one scraped surface crystallizer for removal of the crystallization heat and a growth vessel where the produced crystals have time to grow to a separable size, the separation block usually comprises at least one wash column with peripherals, such as a melt loop with a heat exchanger to melt the crystals.

SUMMARY

Suspension crystallization and respective crystallizers find many applications in the purification and concentration of components of mixtures, particularly in the food industry and in the chemical industry. A special subdivision of suspension melt crystallization is the concentration of aqueous solutions by freezing the water and subsequently separating the thus formed crystals in a solid liquid separator, such as a wash column or centrifuge. This process is used both in the food industry to concentrate food liquids, such as for instance juice, milk, coffee extract, beer or wine, as well as in the chemical industry to reduce the water content of waste streams before they are sent to an incinerator. In such applications the crystallization process is commonly referred to as freeze concentration. In the chemical and petrochemical industry this technique is for example used for obtaining a particular component in pure form from a chemical mixture, for example for the recovery of pure para-xylene from a mixture of isomers. Other common applications in the chemical industry are the purification of crude mixtures of acetic acid, acetonitrile, adipic acid, benzene, caprolactam, durene, ethyl lactate, ionic liquids, lactic acid, methylendiphenylisocyanate (MDI), methacrylic acid, o-phenylphenol, p-dichlorobenze, p-chlorotoluene, phenol and trioxane.

A multi-stage counter-current suspension crystallization apparatus for crystallizing and subsequently separating a component in pure form from a solution is disclosed in EP 1 256 367 A2. More specifically, this document relates to a multi-stage counter-current crystallization apparatus for crystallizing and subsequently separating a component in pure form from a solution, which comprises a first concentration stage as well as a second concentration stage. The first concentration stage comprises i) means for supplying the solution, ii) first crystallization means comprising a heat exchanger of the scraped surface type for forming crystals in the solution, iii) a first crystallization vessel for further growth of the crystals formed by the first crystallization means so as to obtain a first crystal suspension mixture containing larger crystals and iv) first separation means for separating the larger crystals from the first crystal suspension mixture so as to obtain a first concentrated mother liquor. Likewise, the second concentration stage comprises i) means for supplying the first concentrated mother liquor, ii) second crystallization means comprising a heat exchanger of the scraped surface type for forming crystals in the first concentrated mother liquor, iii) a second crystallization vessel for further growth of the crystals formed by the second crystallization means and iv) means for transporting crystals from the second crystallization vessel to the first crystallization vessel. In addition, this multi-stage counter-current crystallization apparatus comprises a bypass conduit arranged outside the crystal-growing vessel of at least one concentration stage for circulating the crystal suspension mixture that is present in the crystal-growing vessel, wherein filter means are present in the bypass conduit for extracting at least a part of the mother liquor from the crystal suspension mixture.

The first separation means, which is also called wash column apparatus, for separating the larger crystals from the first crystal suspension mixture of the first concentration stage of the multi-stage counter-current crystallization apparatus comprises a fully closed cylindrical vessel, in which a moveable piston is arranged. The piston bounds above the piston head a wash column chamber inside the cylindrical vessel and the piston is provided with at least one piston rod having a longitudinal bore, wherein the piston is moved reciprocating in the cylindrical vessel by driving means. Furthermore, filter means are connected to the piston at the side of the wash column chamber and a supply conduit is connected to the end of at least one piston rod that projects outside the cylindrical vessel, wherein the supply conduit functions to supply the crystal suspension mixture to the wash column chamber through the longitudinal bore of the piston rod. In addition, the wash column apparatus comprises a discharge conduit for discharging mother liquor from the wash column chamber after filtration through the filter provided at the piston. Moreover, a circulation conduit is arranged outside the cylindrical vessel, which is in communication with the wash column via an inlet and an outlet and thus allows to circulate crystals and/or melt thereof by transporting crystals and/or melt thereof from the wash column chamber via the inlet into the circulation conduit, through the circulation conduit and at least partially back into the wash column chamber via the outlet. More specifically, a discharge conduit is connected to the circulation conduit for discharging a part of the removed crystals and/or melt thereof, whereas the remaining part of the crystals and/or melt thereof is reintroduced into the cylindrical vessel as wash liquid. The circulation conduit is provided with a heat exchanger for heating the stream of crystals and/or melt thereof, which is transported through the circulation conduit.

During the operation of the wash column apparatus, a particular amount of crystal suspension mixture is introduced into the wash column chamber from the first crystal-growing vessel via the supply conduit and via the hollow piston rod, when the piston makes a suction stroke. Afterwards, the piston makes a compression stroke as a consequence of which the crystal suspension mixture that has been introduced into the wash column chamber is compressed by the piston leading to a compaction of the crystals against the closed side of the cylindrical vessel leading to the formation of a crystal bed. Apart from residues of mother liquor entrapped between the crystals in the crystal bed, most of the mother liquor leaves the wash column chamber via the filter means provided at the piston and is returned to the first crystal-growing vessel of the crystallization apparatus.

For processing aqueous systems, the uppermost part of the crystal bed formed at the closed side of the cylindrical vessel is comminuted and then transferred from the wash column chamber into the circulation conduit. In order to comminute the uppermost part of the crystal bed and transfer the comminuted crystals into the circulation conduit, scrapers in form of rotary discs comprising scraping knives are provided for processing aqueous systems at the upper end of the wash column chamber. Furthermore, the wash liquid, which is reintroduced into the cylindrical vessel, heats the uppermost part of the crystal bed and at least partially melts the uppermost part of the crystal bed, which facilitates the communication and transfer of the crystals and/or melt thereof via the inlet into the circulation conduit. In addition, the heating element, which is incorporated in the circulation conduit, allows to adjust the temperature of the circulated crystals and/or melt thereof. A part thereof is partially removed via a discharge line from the apparatus, whereas the remaining part of the melt is reintroduced as wash liquid into the wash column chamber via the outlet of the circulation conduit. Thus, the circulation conduit is in fact a melt loop. The so obtained wash liquid enters the wash column chamber from above and flows downwards. By moving downward through the wash column chamber and thus through the crystal bed, which is still in the compacted condition effected by the piston, the wash liquid displaces the mother liquor that is present between the crystals of the crystal bed and thus serves to wash out the crystal bed. The zone between crystals with wash liquid in between and crystals with mother liquor in between is commonly referred to as wash front. The displaced mother liquor is discharged from the wash column chamber via the filter means provided at the piston and is returned to the first crystal-growing vessel of the crystallization apparatus.

A significant disadvantage of the aforementioned wash column are the scrapers in form of rotary discs comprising scraping knives provided at the upper side of the wash column chamber for comminuting the uppermost part of the crystal bed and transferring the comminuted crystals in a controlled manner into the circulation conduit. This is due to the fact that these scrapers are mechanically complex parts, which are responsible for about one third of the total investment costs of the wash column apparatus. The reason therefore is that—due to the pressure generated by the piston during the operation of the wash column apparatus—high mechanical forces are applied to the scrapers, so that the scrapers have to be designed stable enough so as to withstand these mechanical forces. Moreover, such rotating scrapers have a start/stop frequency of about 60 times per hour, which is a further engineering challenge leading to high costs for the scraper construction including bearing unit for the scraper shaft and shaft seal. In addition, these scrapers cannot be unlimitedly upscaled and thus restricts the dimensions of the wash column apparatus.

In view of this, the object underlying the present invention is to provide a wash column apparatus for the use in a suspension crystallization process for separating crystals from a crystal suspension mixture composed of crystals and mother liquor, which is mechanically less complex, which requires less investment costs, which requires less maintenance and which can be easily and unlimitedly upscaled.

In accordance with the present invention this object is satisfied by providing a wash column apparatus for the use in a suspension crystallization process for separating crystals from a crystal suspension mixture composed of crystals and mother liquor comprising: a cylindrical vessel, wherein the cylindrical vessel comprises:

- a piston with a piston head and a piston rod, the piston is arranged reciprocatingly movable in the cylindrical vessel, the piston bounding above the piston head a wash chamber inside the vessel and wherein the piston head comprises at least one filter,
- an inlet for supplying a crystal suspension mixture composed of crystals and mother liquor into the cylindrical vessel,
- a first outlet for discharging mother liquor from the cylindrical vessel,
- a second outlet for discharging crystals or crystal melt from the cylindrical vessel,
- a circulation conduit for circulating melt arranged outside the vessel, which is in communication with the wash chamber,
- a static grid element arranged in the wash chamber preferably near the closed end of the cylindrical vessel for restricting the movement of the crystal bed that has been compacted in the wash chamber by the piston and for directing the wash liquid entering into the cylindrical vessel from the circulation conduit so as to homogeneously distribute it over the entire cross-section of the wash column, the static grid element comprises at least one element, which is at least substantially vertically extending, and at least one cavity, which is at least substantially vertically extending, wherein the at least one cavity, which is at least substantially vertically extending, is open at its upper and lower ends, but otherwise at least partially closed, wherein substantially vertically extending means that the longitudinal axis of the at least one element and of the at least one cavity extends at an angle of 0 to 60° to the vertical direction.

The at least one cavity, which is at least substantially vertically extending, is defined by the at least one element, which is at least substantially vertically extending, of the static grid element, which laterally surrounds the vertically extending cavity and thus enclose it except for the upper and lower ends of the cavity. The vertical direction corresponds to the longitudinal axis of the wash column apparatus.

This solution bases on the surprising finding that the scraper in form of rotary discs comprising scraping knives provided for processing aqueous systems at the upper side of the prior art wash column chambers (and for processing non-aqueous systems at the lower side of the prior art wash column chambers) for comminuting the most compressed part of the crystal bed and transferring the comminuted crystals and/or melt thereof into the circulation conduit can be with great advantage replaced by a static grid element, namely a static grid element comprising at least one element, which is at least substantially vertically extending, and at least one cavity, which is at least substantially vertically extending, wherein the at least one cavity is open at its—seen in vertical direction or along the longitudinal axis of the wash column apparatus, respectively,—upper and lower ends, but otherwise at least partially closed by the adjacent at least substantially vertically extending element. Such a static grid element allows to dispense the known rotary scrapers in the wash column and thus to reliably avoid the disadvantages associated with the rotary scrapers. More specifically, the static grid element used in accordance with the present invention is mechanically strong enough to withstand the forces imposed by the crystal bed on the grid. The static grid element assures a high enough resistance to vertical movement of the crystal bed in the wash chamber. Due to this, a crystal bed can be formed and maintained during the operation of the wash column apparatus. Moreover, the static grid element nevertheless has a sufficient open geometry so that wash liquid can flow through the static grid element from and to the adjacent crystal bed. The melt at the surface portion of the crystal bed may be easily formed for instance by heating the crystal bed by means of a heating element. Alternatively and actually preferred in accordance with the present invention, the crystal bed may be heated by means of heat transfer from the melt flow or wash liquid, respectively, which is reentering into the cylindrical vessel from the circulation conduit after having circulated therein. Furthermore, the static grid element allows to direct the wash liquid reentering into the cylindrical vessel from the circulation conduit so that it is homogeneously distributed over the entire cross-section of the wash column, i.e. over the surface of the crystal bed. In further advantage in comparison to the known rotary scrapers, the static grid element as used in accordance with the present invention is mechanically simple, thus requiring comparable low investment costs and only comparable low maintenance need, and is furthermore unlimitedly scalable.

In accordance with the present invention, the at least one substantially vertically extending cavity is open at its upper and lower ends. This means that, in vertical direction, the upper and lower ends of the cavities comprise an opening, wherein the opening may extend over the whole cross-section of the cavity or only over a part of the cross-section of the cavity. So, lips, overhangs or bridges may be present at the upper and lower ends of the cavities, which partially close the upper and lower ends of the cavity. Preferably, the openings at the upper and lower ends cover 10 to 100%, more preferably 40 to 100%, still more preferably 60 to 100%, even more preferably 80 to 100% and most preferably all of the cross-section area of the cavity.

Furthermore, the at least one substantially vertically extending cavity is at least partially closed otherwise, which means that the cavity is provided with a wall, which is formed by the adjacent at least substantially vertical element, at the ends except the upper and lower ends, wherein the wall may have one or more holes. Preferably, the wall of the cavity comprises less than 50% open area, which means that the total area of holes in the wall is less than 50% of the total area of the wall including the holes. More preferably, the wall comprises less than 30% open area, even more preferably less than 20% open area, particularly preferably less than 10% open area and most preferably no open area, i.e. no holes, at all. The holes may have for example a circular cross-section or a slit-like cross-section.

In accordance with a further preferred embodiment of the present invention, the at least substantially vertically extending element and cavity extend at an angle of 0 to 30°, more preferably of 0 to 20°, even more preferably of 0 to 10° and most more preferably of 0° to the vertical direction.

In principle, the present invention is not limited concerning the geometry of the at least one cavity, which is at least substantially vertically extending. For example, the at least one vertically extending cavity may have a rectangular cross-section, a hexagonal cross-section, a circular cross-section or an annular cross-section. Particular good results obtained, when the at least one cavity, which is at least substantially vertically extending, has a rectangular cross-section.

Preferably, the static grid element comprises at least two, preferably at least three and more preferably at least four at least substantially vertically extending cavities, which are open at their upper and lower ends, but otherwise at least partially closed by the adjacent vertically extending elements. This allows to optimize the dimensions and in particular the cross-sectional area of the cavities in view of their functions, namely to have a high enough resistance to vertical movement to allow the formation and maintenance of a crystal bed, but on the other hand to have a sufficient open geometry for a free, homogeneously distribution of the melt flow or wash liquid, respectively, over the cross-section of the wash column. This is due to the fact that if more than one cavity is present in the static grid element, a higher degree of freedom for distributing the cross-sectional area between the vertically extending element(s) and cavities exists.

In accordance with a particular preferred embodiment of the present invention the static grid element comprises as at least substantially vertically extending element at least two at least substantially vertically arranged parallel plates and more preferably at least two vertically arranged parallel plates, wherein at least one cavity is formed between each of two adjacent plates, wherein the at least one cavity is open at its upper and lower ends, but otherwise at least partially and more preferably completely closed by the adjacent plates. This embodiment is especially preferred, because plates as vertically extending elements have on the one hand a high mechanical stability and on the other hand provide sufficient resistance for the vertical bed movement to allow the formation and maintenance of a crystal bed.

In a further development of the idea of the present invention, it is proposed that the static grid element comprises 2 to 20, more preferably 2 to 10, even more preferably 3 to 10 and most preferably 4 to 7 plates, which are arranged at least substantially vertically and preferably in parallel with each other. More preferably, the plates are arranged vertically and in parallel with each other. Between each of two adjacent plates, at least one cavity and preferably exactly one cavity is formed, which has preferably a rectangular cross-section. It is preferable that all plates have the same radial distance from each other, so that all cavities formed between two adjacent plates have the same thickness or width, respectively.

In view of the above, it is preferred that the plates of the static grid element are rectangular plates. This leads to the formation of cuboidal cavities between two adjacent plates. Also in this embodiment it is preferred that all plates have the same radial distance from each other, so that all cavities formed between two adjacent plates have the same three-dimensional geometry. All of the cuboidal cavities are open at their upper and lower ends, but otherwise closed by the adjacent plates.

Preferably, the plates are rounded at their end which is oriented to the crystal bed so as to have in cross-section a U-shape at this end. For the ease of nomenclature, the end/side of the static grid element and the at least substantially vertically extending element(s) thereof, which is oriented to the crystal bed, is subsequently also referred to as the "piston side" of the wash column apparatus. In contrast thereto, the opposite end/side of the static grid element and the vertically extending element(s) thereof is subsequently also referred to as the "circulation conduit side" or "melt loop side", respectively, of the wash column apparatus.

The rounded ends facilitate the function of the plates, namely to allow the wash liquid reentering into the cylindrical vessel from the circulation conduit to melt the crystals of the crystal bed homogeneously over the cross-section of the crystal bed, since the surface of the crystal bed touches the rounded plates only at their lowest points. On account of this reason, a flow path is provided for the wash liquid reentering into the cylindrical vessel from the circulation conduit allowing the wash liquid to reach also the crystals below the cross-sectional area of the plates.

Particular good results are obtained, in particular for a wash column having a diameter of 50 to 2,000 mm, if the plates have a height of 10 to 300 mm and a thickness of 1 to 20 mm. More preferably, the plates have a height of 20 to 200 mm and a thickness of 2 to 10 mm and more preferably the plates have a height of 50 to 100 mm and a thickness of 4 to 6 mm.

In a further development of the idea of the present invention, it is proposed that the open cross-sectional area of the static grid element, which is the ratio of the sum of the cross-sectional areas of the cavities of the static grid element divided by the total cross-sectional area of the static grid element, is 10 to 90%, more preferably 20 to 80% and most preferably 45 to 55%. Also in this embodiment, the at least substantially vertically extending elements of the static grid element are preferably plates and more preferably the radial distance between all adjacent plates is the same so that all cavities have the same cross-sectional form and cross-sectional area.

It is preferred that the plates of the static grid element are made of a metal. Particular good results are obtained, if the plates are made of steel and more preferably of stainless steel. Particularly in this embodiment, it is preferred that the metal plates are rounded at their end which is oriented to the crystal bed so as to have in cross-section a U-shape at this end.

According to an alternative embodiment of the present invention, the static grid element comprises a first set of plates and a second set of plates, wherein the first set of plates comprises preferably 2 to 20, more preferably 2 to 10, even more preferably 3 to 10 and most preferably 4 to 7 plates, which are arranged at least substantially vertically and in parallel with each other, and the second set of plates comprises preferably 2 to 20, more preferably 2 to 10, even more preferably 3 to 10 and most preferably 4 to 7 plates, which are arranged at least substantially vertically and in parallel with each other, wherein the plates of the second set are oriented perpendicular to the plates of the first set so as to obtain—in top view—a static grid element with a mesh-like structure.

According to still an alternative embodiment of the present invention, the static grid element comprises 2 to 20, more preferably 2 to 10 and most preferably 4 to 7 at least substantially vertically extending cylindrical cavities.

As usual, the static grid element as well as the circulation conduit are arranged for aqueous applications, such as for instance freeze concentration applications, at the top end of the wash column, whereas the static grid element as well as the circulation conduit are arranged for non-aqueous applications, such as for instance chemical applications, at the bottom end of the wash column. In both cases, the inlet leading from the cylindrical vessel into the circulation conduit line and the outlet leading from the circulation conduit line into the cylindrical vessel are arranged downstream of the static grid element, wherein upstream means the direction, in which the piston performs the compression stroke. Thus, in the first mentioned case, in which the static grid element as well as the circulation conduit are arranged at the top end of the wash column, the inlet and outlet of the circulation conduit are arranged above the upper end of the static grid element, whereas in the other case, in which the static grid element as well as the circulation conduit are arranged at the bottom end of the wash column, the inlet and outlet of the circulation conduit are arranged below the lower end of the static grid element.

The function of the circulation conduit is to provide a means to precisely control the temperature of the crystals or melt thereof, which is circulated in the circulation conduit and partially reintroduced as wash liquid into the cylindrical vessel. A part of the circulating crystals or melt thereof is discharged from the circulation conduit as product, whereas a small part of the melt is used as wash liquid and moves through the crystal bed so as to displace the mother liquor that is present between the crystals of the crystal bed and thus to wash out the crystal bed. When the reentered melt touches the surface of the crystal bed, heat is transferred from the melt to the crystals, thus melting substantially all of the crystals. In order to control the temperature of the melt, preferably a heating element, such as a heat exchanger, is arranged in the circulation conduit. Preferably, the wash column is operated in accordance with the present invention so that all of the heat necessary for melting the crystals is provided by the heating element arranged in the circulation conduit. Thus, in this embodiment, the circulation conduit is a direct loop, i.e. a closed line leading from the inlet coming from the cylindrical vessel via the outlet of the same conduit into the cylindrical vessel of the wash column. A particular advantage of the present invention is that the well-defined temperature in the circulation conduit allows to adjust a very low temperature difference between the circulation conduit and the crystal bed. In contrast thereto, temperature control only by the use of an actively heated grid element needs a much higher temperature difference to sufficiently melt the crystal mass across the cross-section of the bed. Furthermore, the heat distribution is in this case far less homogeneous and most pronounced at the small contact area between the bed and the parallel arranged heat transfer pipes of grid.

As described further below, the circulation conduit may also indirectly lead, for instance if the wash column is a wash column thickener for separating the mother liquor from the crystal suspension mixture formed in the second crystallizer, from the inlet coming from the cylindrical vessel via another crystallization vessel back to the cylindrical vessel of the wash column.

However, in accordance with another embodiment of the present invention, it is also contemplated to further—i.e. in addition to the heating element arranged in the circulation conduit—provide a heating element in the static grid element, such as in particular at the piston side of the at least substantially vertically extending element(s) of the static grid element. For this purpose, for instance at least one of the at least one element, which is at least substantially vertically extending, of the static grid element may comprise a channel for transferring a heat transfer medium for heating the vertically extending element and thus the cavity surrounded by it. The heating supports the melting of crystals at the surface portion at the circulation conduit side of the crystal bed and particularly a homogeneous melting over the cross-sectional area of the crystal bed. Optionally, all at least substantially vertically extending elements may comprise a channel for transferring a heat transfer medium for heating the at least substantially vertically extending elements and thus the cavities surrounded by them. Thus, in the embodiment of the present invention, in which the at least substantially vertically extending elements are (metal) plates, all (metal) plates may comprise a channel for transferring a heat transfer medium for heating the (metal) plates and thus the cavities surrounded by them. This may be easily achieved for instance by providing (metal) plates, which are rounded at their lower ends so as to have in cross-section a U-shape at their lower ends, wherein the channels for transferring a heat transfer medium are arranged in the lower rounded ends of the (metal) plates.

According to still another embodiment of the present invention, a heating element may be provided at the closed end of the cylindrical vessel downstream of the static grid element. Also in this embodiment, it is preferred that in addition to this heating element a heating element is arranged in the circulation conduit. This embodiment is useful in particular in a case, when the initial crystal bed is very soft. In such a case, the crystal bed may pass in the initial bed build-up phase the static grid element, i.e. the static grid element does not provide enough friction with the initial (not yet fully compressed) crystal bed. In this case the fully compressed crystal bed state is reached when the initial crystal bed is stopped by the wall of the cylindrical vessel downstream of the static grid element. During the period of initial bed compression the melt loop pump is preferably stopped, because the turbulence created by the pump would prevent the formation of a fully compressed bed. However, the stop of the pump may lead to a plugging of the space downstream of the static grid element. However, the heating element provided at the downstream side of the static grid element in the cylindrical vessel in accordance with this embodiment of the present invention allows to create an initial flow path for the melt flow wash liquid, respectively, to the circulation conduit. Once such a flow path exists the blockage by the compressed crystals on the downstream side of the grid will be quickly removed by the circulating liquid.

Concerning the kind and position of the inlet for supplying a crystal suspension mixture composed of crystals and mother liquor into the vessel, the present invention is not particularly limited. For example, the respective inlet may be a conduit leading into the end of at least one piston rod that projects outside the cylindrical vessel, wherein the inlet functions to supply the crystal suspension mixture to the wash column chamber through a longitudinal bore provided in the interior of the piston rod. Alternatively, an inlet conduit may be arranged so as to lead into the wash chamber of the cylindrical vessel.

As set out above, the piston head of the piston provided in the cylindrical vessel comprises at least one filter for separating crystals from the crystal suspension mixture by pressing mother liquid through the filter of the piston, while crystals remain in the wash chamber. Preferably, the wash column apparatus in accordance with the present invention does not contain a further filter in addition to that provided in the piston head and in particular no further filter outside the piston, such as a filter in the wash chamber. Such a further filter in the wash chamber would not only increase the investment costs for the wash column apparatus, but would also result during the operation of the apparatus to inhomogeneous pressure profiles in the crystal bed and thus hinders the maintenance of a stable wash front formed by the wash liquid.

According to a further aspect, the present invention relates to a suspension crystallization plant comprising at least one first crystallization stage, which comprises:
    a first crystallization block, which comprises:
        an inlet for supplying the solution comprising the substance to be purified by crystallization,
        a device configured to cool with a cooled surface for cooling the crystal suspension mixture at the cooled surface to promote crystal formation and growth,
        crystal-growing volume for the growth of said crystals and
        a first outlet,
and
    wash column apparatus for separating the larger crystals from the first crystal suspension mixture so as to obtain a first concentrated mother liquor.

Preferably, the first crystallization block further contains a mechanical scraping means for scraping the cooled surface and/or mixing a layer adjacent to the cooled surface together with a bulk of the crystal suspension mixture.

In accordance with a further embodiment of the present invention, the suspension crystallization plant further comprises at least one second crystallization stage, which comprises:
    a second crystallization block, which comprises:
        an inlet for first concentrated mother liquor,
        a device configured to cool with a cooled surface for cooling the crystal suspension mixture at the cooled surface to promote crystal formation and growth,
        crystal-growing volume for the growth of said crystals and
        an outlet,
and
    a return line leading from the second crystallization block to the first crystallization block for returning at least a part of the crystal suspension mixture from the second crystallization block to the first crystallization block.

In accordance with still a further embodiment of the present invention, the suspension crystallization plant comprises in addition to the aforementioned first and second crystallization stages a wash column thickener for separating the mother liquor from the crystal suspension mixture formed in the second crystallizer, wherein the wash column thickener is provided with an inlet line coming from the second crystallization block and an outlet line leading to the first crystallization block. The wash column thickener form thus with its inlet line and its outline line a parallel line to the return line leading from the second crystallization block to the first crystallization block. During the operation of the suspension crystallization plant, a part from the crystal suspension mixture from the second crystallization block is led to the first crystallization block directly via the return line, whereas the remaining part of the crystal suspension mixture is led from the second crystallization block to the first crystallization block indirectly via the wash column thickener, which concentrates the crystals in the crystal suspension mixture.

According to a still further aspect, the present invention relates to a method for separating crystals from a crystal suspension mixture composed of crystals and mother liquor comprising supplying a crystal suspension mixture composed of crystals and mother liquor to the inlet of a wash column apparatus as described above.

The supply of the crystal suspension mixture into the wash column apparatus is preferably performed by controlling that the piston of the wash column moves downwardly so as to perform a suction stroke.

In a further development of the present invention, it is proposed that the method comprises for aqueous applications the step of forming a crystal bed at the upper part of the wash column apparatus directly below the static grid element. For non-aqueous applications, such as for instance chemical applications, the method comprises the step of forming a crystal bed at the lower part of the wash column apparatus directly below the static grid element. Preferably, the formation of the crystal bed is conducted by controlling that the piston of the wash column moves (depending on the wash column orientation) upwardly or downwardly so as to perform a compression stroke.

It is preferred that a portion of the crystals or crystal melt, respectively, which is circulated through the circulation conduit of the wash column apparatus, is discharged from the plant via an outlet, whereas the remaining portion of the circulated crystals or crystal melt, respectively, is reentered into the cylindrical vessel of the wash column apparatus and used as wash liquid and is forced into the crystal bed. Preferably, the flow rate is adjusted to be high and to be turbulent in the circulation conduit and in the cavities of the static grid element. This flow regime causes almost all, i.e. more than 99% of the crystals to melt at the interface between the flow restriction and the crystal bed. This requires a highly compacted bed, which is and can only be achieved by mechanical compression with a piston.

Preferably, the method in accordance with the present invention comprises the step of continuously detecting the position of the wash front for example by means of a sensor.

Additionally, it is preferred that the method comprises the step of controlling the discharge from pure crystals or pure crystal melt, respectively, from the wash column apparatus in dependency of the detected position of the wash front.

The wash column apparatus of the present invention as well as the suspension crystallization plant of the present invention may be particularly used in the food industry to concentrate food liquids, such as for instance juice, milk, coffee extract, beer or wine, as well as in the chemical industry to reduce the water content of waste streams before they are send to an incinerator or to purify a chemical substance in a crude mixture, such as to purify acetic acid, acetonitrile, adipic acid, benzene, caprolactam, durene, ethyl lactate, ionic liquids, lactic acid, methylendiphenylisocyanate (MDI), methacrylic acid, o-phenylphenol, p-dichlorobenze, p-chlorotoluene, phenol or trioxane.

According to a still further aspect, the present invention relates to a method for thickening a crystal suspension mixture composed of crystals and mother liquor comprising supplying a crystal suspension mixture composed of crystals and mother liquor to the inlet of a wash column apparatus as described above. Preferably, the crystal suspension mixture supplied into the wash column thickener comes from a second crystallization stage and the concentration of the crystals in the mixture is increased in the thickener. More specifically, as set out above in detail a crystal bed is formed in the wash column. The partly compressed bed is soft, passes the static grid element and is then dispersed in a transport medium, so as to form the concentrated, i.e. thickened, crystal suspension mixture, which is then led via the circulation conduit into the first crystallization block. Preferably, a further line leads from the first crystallization block into the wash column to lead a partial stream of the crystal suspension mixture included in the first crystallization block as transport medium into the wash column thickener. The conduit leading from the wash column thickener into the first crystallization block together with the line leads from the first crystallization block into the wash column form an (indirect) circulation conduit. In this embodiment, in the circulation conduit no heating element is provided, because no crystal melt is formed.

Furthermore, the present invention relates to a method for suspension crystallizing a solution comprising supplying the solution to the inlet means of a suspension crystallization plant as described above.

BRIEF DESCRIPTION OF THE DRAWINGS

The invention will be explained in more detail hereinafter with reference to the drawings.

FIG. 3 shows a schematic perspective cross-sectional view of the wash column apparatus shown in FIGS. 1 and 2 without piston in accordance with the present invention.

FIG. 4 shows a schematic top view of a static grid element of the wash column apparatus shown in FIGS. 1 to 3 in accordance with the present invention.

FIGS. 5A-5G show top views of static grid elements and of at least substantially vertically extending elements forming the static grid element of the wash column apparatus in accordance with further embodiments of the present invention.

DETAILED DESCRIPTION OF THE EMBODIMENTS

Figure 1:
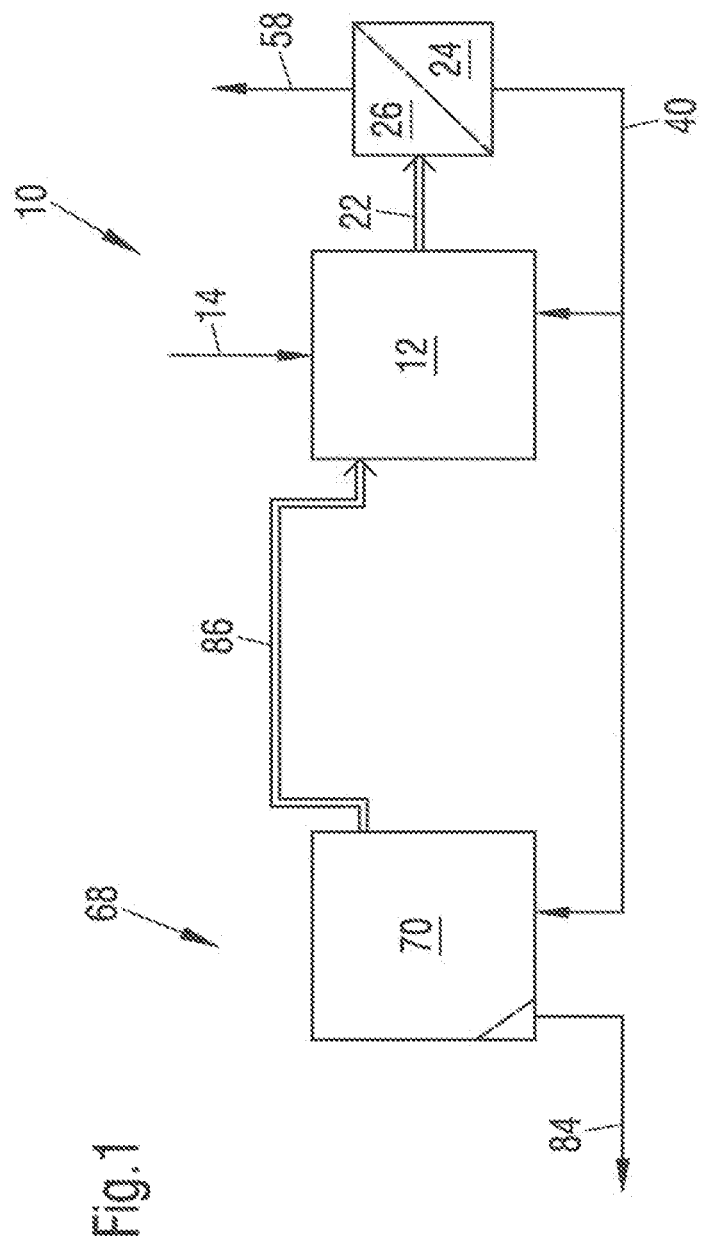
FIG. 1 shows a schematic view of a two-stage suspension crystallization plant in accordance with the present invention.

The suspension crystallization plant shown in FIG. 1 comprises a first crystallization stage 10, which comprises a first crystallization block 12 provided with an inlet 14 for supplying the starting solution. The starting solution may be for example an aqueous solution, such as milk, juice, coffee extract, beer or wine, in which water is the component to be separated by crystallization and in which the final concentrate, namely milk concentrate, is processed further as an intermediate product. Alternatively, the starting solution may be a crude solution containing xylene isomers, acetic acid, acetonitrile, adipic acid, benzene, caprolactam, durene, ethyl lactate, ionic liquids, lactic acid, methylendiphenyli-socyanate (MDI), methacrylic acid, o-phenylphenol, p-dichlorobenze, p-chlorotoluene, phenol or trioxane.

The first crystallization block 12 comprises a device configured to cool (not shown) with a cooled surface for cooling the crystal suspension mixture at the cooled surface to promote crystal formation and growth, as well as a crystal-growing volume for the growth of said crystals (not shown). In addition, the first crystallization block 12 contains a mechanical scraping means for scraping the cooled surface and/or mixing a layer adjacent to the cooled surface together with a bulk of the crystal suspension mixture (not shown).

Furthermore, the first crystallization block 12 comprises a discharge line 22 for removing a part of the crystal suspension mixture composed of crystals and mother liquor formed in the first crystallization block 12 and for transferring it to the wash column apparatus 24 for separating crystals from the crystal suspension mixture. More specifically, the crystal suspension mixture is introduced into the wash column apparatus 24 via an inlet 26, which is connected with the discharge line 22.

Figure 2:
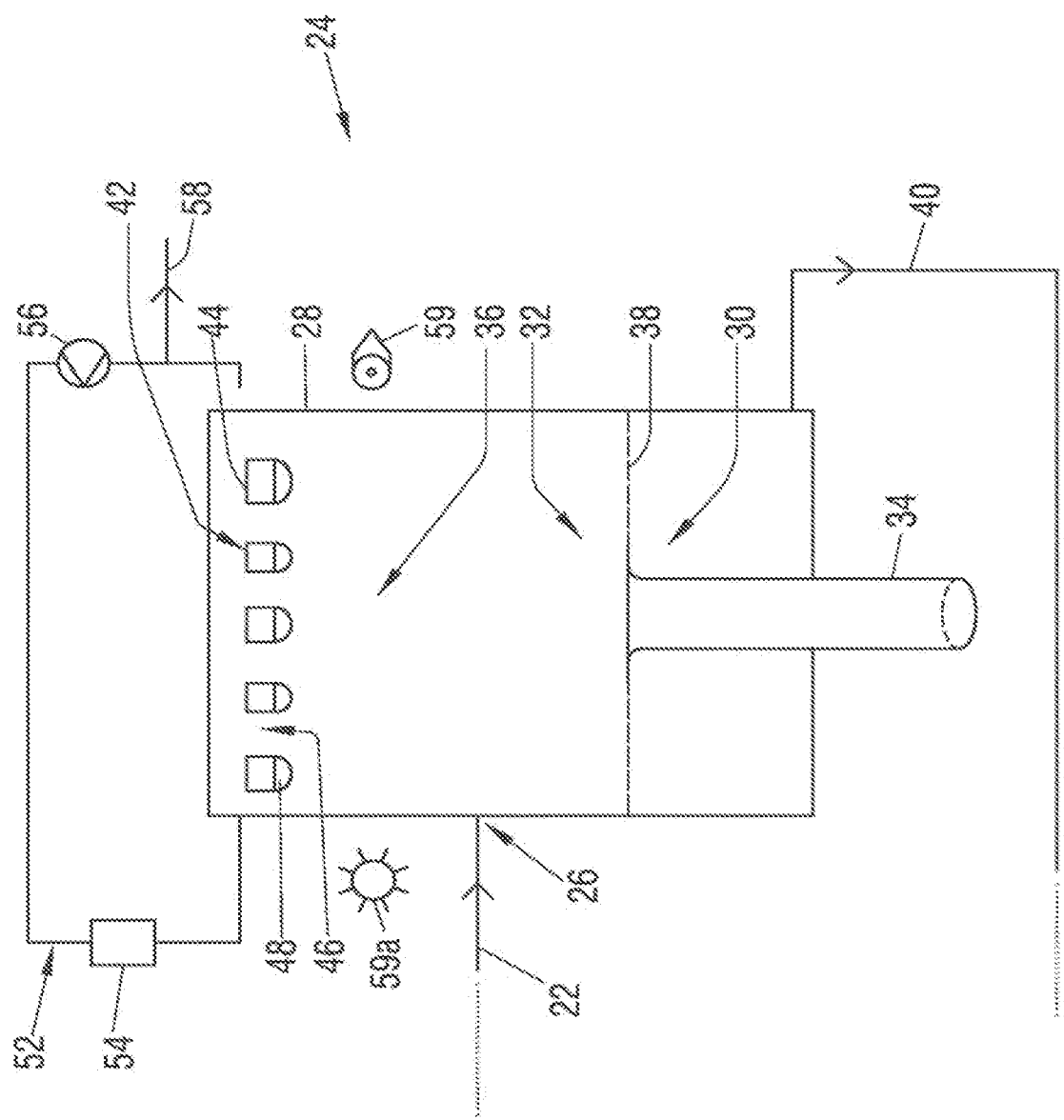
FIG. 2 shows a schematic cross-sectional view of the wash column apparatus shown in FIG. 1 in accordance with the present invention.

The wash column apparatus 24, which is in more detail shown in FIGS. 2 and 3, comprises a cylindrical vessel 28, in which a piston 30 is arranged so as to be reciprocatingly movable in the vessel 28. The piston 30 comprises a piston head 32 and a piston rod 34, the piston 30 bounding above the piston head 32 a wash chamber 36 inside the cylindrical vessel 28. The piston head 32 comprises a filter 38, which allows that mother liquor flows through the piston head 32, when the piston 30 is moved upwardly, while the crystals cannot flow through the piston head 32. The mother liquor passes the filter 38 of the piston head 32 and is discharged from the cylindrical vessel 28 via an outlet line 40, which is arranged in the bottom area of the cylindrical vessel 28.

In the upper part of the cylindrical vessel 28 a static grid element 42 is provided, which is shown in further detail in FIGS. 3 and 4. The static grid element 42 comprises five metal plates 44 made from stainless steel, which are arranged in vertical direction and in parallel with each other. The metal plates 44 are rounded at their lower ends so as to have, in cross-section, a U-shape at their lower ends. Between each of two adjacent metal plates 44 essentially cuboidal cavities 46 are formed, namely cavities 46, which are cuboidal except that the lower part is inverse rounded as consequence of the rounded lower ends of the metal plates 44. The cavities 46 are open at their upper and lower ends, but are otherwise closed by the surfaces of the metal plates 44 surrounding the cavities 46. Channels 48 for transferring a heat transfer medium are provided in the lower rounded ends of the metal plates 44, which allow to heat the metal plates 44 during operation. In addition, the wash column apparatus 24 comprises a distribution chamber 50 including control means for distributing the heat transfer medium into the channels 48. The metal plates 44 have a height of about 75 mm and a thickness of about 5 mm.

A circulation conduit 52 or melt loop, respectively, is arranged in the upper part of the cylindrical vessel 28 above the static grid element 42. The circulation conduit 52 comprises a heating element 54, a pump 56 and an outlet 58 for discharging crystals or melt thereof from the cylindrical vessel 28.

In addition, a sensor 59, 59a is provided outside the cylindrical vessel 28 at a position slightly below the height of the static grid element 42, for detecting during the operation of the wash column apparatus 24 the position of the wash front in the compacted crystal bed. The sensor outside is an optical sensor and is used in combination with sight glasses for the light source and the detector or a partly transparent cylindrical vessel 28. It is a requirement that there is a color difference between washed and unwashed crystal bed for the sensor 59, 59a to be effective. Alternatively the temperature difference between washed and unwashed crystal bed, which always exists, is detected by one or more temperature sensors in the wall of cylindrical vessel 28.

The outlet line 40 for discharging the mother liquor from the wash column apparatus 24 is connected with the first crystallization block 12 for reintroducing a part of the mother liquor separated in the wash column apparatus 24 into the first crystallization block 12 for further concentration and to a second crystallization stage 68, namely a second crystallization block 70. Likewise to the first crystallization block 12, the second crystallization block 70 comprises a device configured to cool (not shown) with a cooled surface for cooling the crystal suspension mixture at the cooled surface to promote crystal formation and growth, as well as a crystal-growing volume for the growth of said crystals (not shown). In addition, the second crystallization block 70 contains a mechanical scraping means for scraping the cooled surface and/or mixing a layer adjacent to the cooled surface together with a bulk of the crystal suspension mixture (not shown). A part of the crystal suspension mixture is continuously returned from the second crystallization block 70 to the first crystallization block 12 via the crystal return line 86, whereas the concentrated mother liquor formed in the second crystallization is conducted via discharge line 84 from the plant. In order to discharge crystal free mother liquor, preferably filter (not shown) are provided in the second crystallization block 70 and/or in the discharge line 84.

In operation, starting solution, such as for example milk, in which water is the component to be separated by crystallization, is continuously fed via inlet 14 into the first crystallization block 12, where the solution is cooled so that crystals are formed leading to a crystal suspension mixture in the vessel 12. A part of the concentrated crystal suspension mixture formed in the first crystallization block 12 is transported via the discharge line 22 into the wash column apparatus 24, where the crystals are separated from the mother liquor and washed. More specifically, the concentrated crystal suspension mixture is introduced into the wash column apparatus 24 via an inlet 26, in which the piston 30 is moved up and down in a controlled manner. When the piston makes a suction stroke, i.e. when the piston is moved downwardly, a particular amount of crystal suspension mixture is introduced from the inlet 26 into the wash chamber 36. When the predetermined amount of crystal suspension mixture is introduced into the wash chamber 36, the piston 30 is controlled to make a compression stroke, i.e. to move upwardly, which leads to a compression or compaction, respectively, of the crystal suspension mixture, since the crystal suspension mixture is moved towards the static grid element 42, in which a high resistance against further the vertical movement is subjected to the crystal suspension mixture. Therefore, a compacted crystal bed is formed in the upper part of the wash chamber 36. During the compression stroke of the piston 30, most of the mother liquor contained in the crystal suspension mixture is pressed through the filter 38 of the piston head 32 and leaves the wash column apparatus 24 via the outlet 40, wherein a partial stream thereof is returned partially to the first crystallization block 12 of the crystallization apparatus, whereas the remaining partial stream is led into the second crystallization block 70.

The uppermost part of the crystal bed formed close to the lower end of the static grid element 42 is molten mainly as a consequence of heat transfer from the melt flow reentering the cylindrical vessel 28 from the circulation conduit 52 and to a minor extent as a consequence of heat transfer from the heat transfer medium circulating through the channels 48 of the static grid element 42. The molten crystals are pressed by the pressure generated through the upwardly moved piston 30 into the melt loop 52, where it is pumped by means of pump 56 and heated via the heating element 54 so as to control the temperature of the melt. A part of the crystal melt is removed from the plant via the outlet 58, wherein the remainder of the circulated crystal melt is reintroduced into the cylindrical vessel 28 from above via the outlet of the melt loop 52. The crystal melt or wash liquid, respectively, flows down the cavities 46 of the static grid element 42 onto the top of the crystal bed and through the crystal bed downwardly. During moving downwardly through the crystal bed, the crystal melt displaces the mother liquor that is present between the crystals of the crystal bed and thus serves to wash out the crystal bed. Thus, the crystal melt in fact acts as wash liquid. During moving downwardly through the crystal bed and displacing the mother liquor a wash front is formed at the phase boundary between the crystal melt and the mother liquor. The operation of the wash column apparatus 24 is among others controlled by the moving position of the wash front, which is continuously detected by the sensor 59, 59a. More specifically, when the wash front reaches a certain position indicating that the crystal bed has been completely washed by the wash liquid, a valve (not shown) in the outlet 58 is controlled to open in order to discharge pure crystal melt via outlet 58 from the plant. In addition, the piston 30 is then controlled to perform a suction stroke, in order to supply a particular amount of crystal suspension mixture from the first crystallization block 12 into the wash column chamber 36 via the discharge line 22. Afterwards, the piston is controlled to make a compression stroke as a consequence of which the crystal suspension mixture that has been introduced into the wash column chamber 36 is compressed by the piston 30 leading to a compaction of the crystals against the lower end of the crystal bed, if any is remaining from the former piston cycle, or against the lower end of the static grid element 42 for forming a crystal bed. Furthermore, the valve (not shown) in the outlet 58 is controlled to close in order to stop the discharge of crystal melt via outlet 58. All in all, the wash column apparatus 24 leads to an efficient separation of concentrated mother liquor and crystals and also allows to obtain very pure crystals on account of an efficient washing of the crystals from the mother liquor before discharging the molten crystals from the plant.

As set out above, a part of the concentrated mother liquor discharged from the wash column 24 via the outlet line 40, which still contains valuable product, is reintroduced into the first crystallization block 12, whereas the remaining part is led to the second crystallization block 70, where it is cooled so that crystals are formed leading to a crystal suspension mixture in the crystallization block 70. A part of the crystal suspension mixture formed in the second crystallization block 70 is transported via the return line 86 into the first crystallization block 12, whereas the purified mother liquor is transported via the discharge line 84 from the plant.

The wash column apparatus 24 shown in FIG. 2 is designed to separate crystals from an aqueous crystal suspension mixture, i.e. crystals from an aqueous suspension. When a non-aqueous crystal suspension mixture shall be separated, the wash column apparatus 24 is flipped around the horizontal plane so that the upper side forms the lower side and the lower side form the upper side. Thus, the circulation conduit 52 would be the lower part of the wash column apparatus 24 and the piston rod 34 would extend vertically up.

FIG. 5A shows a top view of a static grid element 42 according to a further embodiment of the present invention. The static grid element 42 comprises a first set of 5 parallel metal plates 44 and a second set of 3 parallel metal plates 44, wherein the plates 44 of the first set are oriented perpendicular to those of the second set so that, in top view, a static grid element 42 with a mesh-like structure is obtained.

The plates 44 are most preferably compact plates 44 without any opening, as shown in FIG. 5B. However, it is possible that the plates 44 comprise holes, such as circular holes 87, as shown in FIG. 5C, or slit-like holes 87 as shown in FIG. 5D.

Most preferably, the plates 44 extend vertical, i.e. they have an angle of 0° to the vertical direction. However, it is also possible that the plates 44 are slightly inclined, i.e. substantially vertically extending, which means that the plates may have an angle α to the vertical direction of up to 60°, as schematically shown in FIG. 5E.

FIG. 5F shows a top view of a static grid element 42 according to a further embodiment of the present invention. The static grid element 42 of this embodiment is a cylindrical body with cylindrical cavities 46 formed therein.

FIG. 5G shows a top view of a static grid element 42 according to still a further embodiment of the present invention. The static grid element 42 of this embodiment is a cylindrical body with cylindrical vertically extending elements 44 formed therein. The remaining part of the cylindrical static grid element 42 is the cavity 46.

Figure 6:
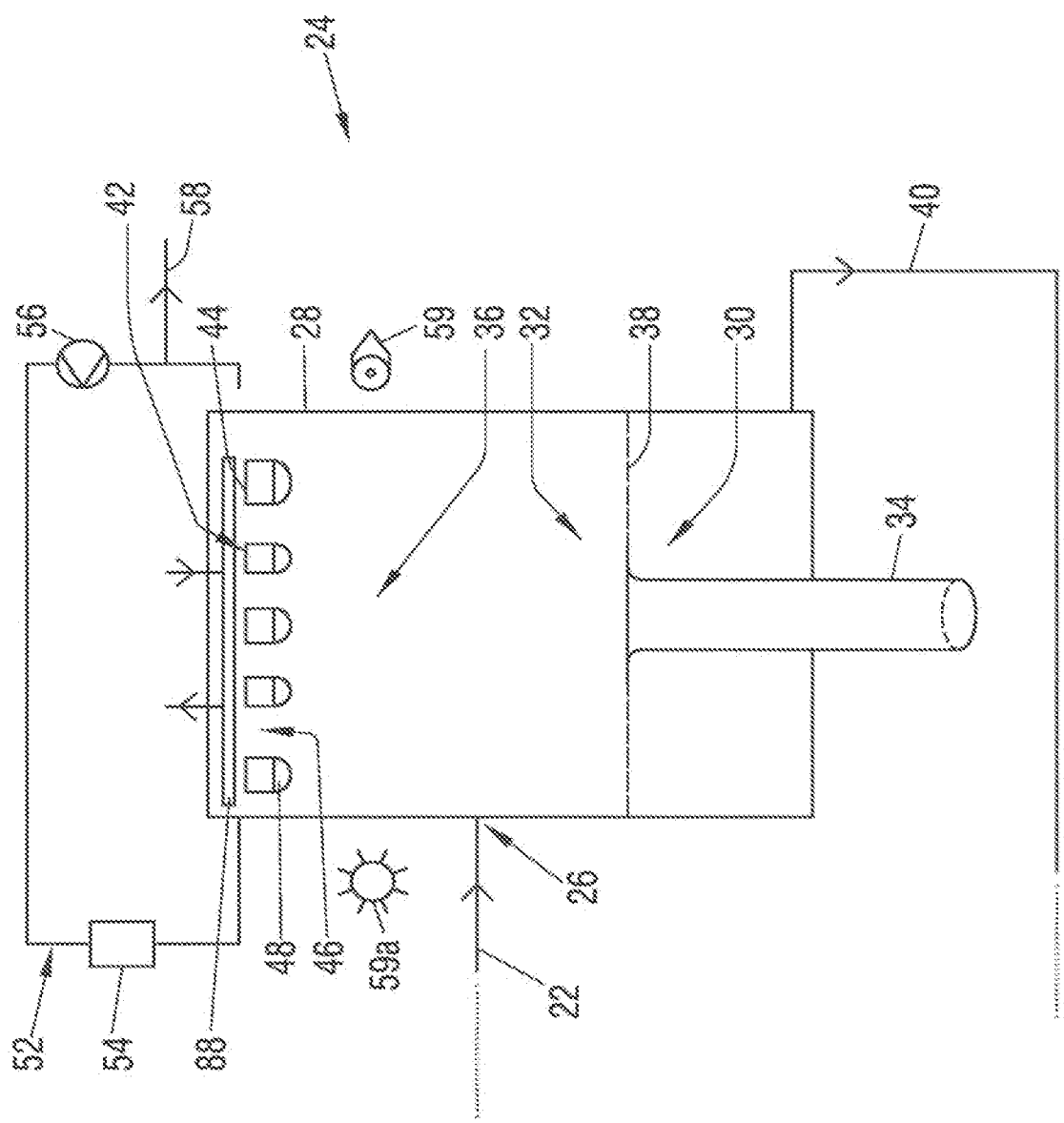
FIG. 6 shows a schematic cross-sectional view of the wash column apparatus in accordance with a further embodiment of the present invention.

The wash column apparatus 24 shown in FIG. 6 is constructed like that of FIG. 2 except that an additional heating element 88, through which heat transfer medium is circulated during the operation of the wash column apparatus 24 to support the formation of crystal melt at the surface of the crystal bed, is provided at the uppermost end of the cylindrical vessel 28.

Figure 7:
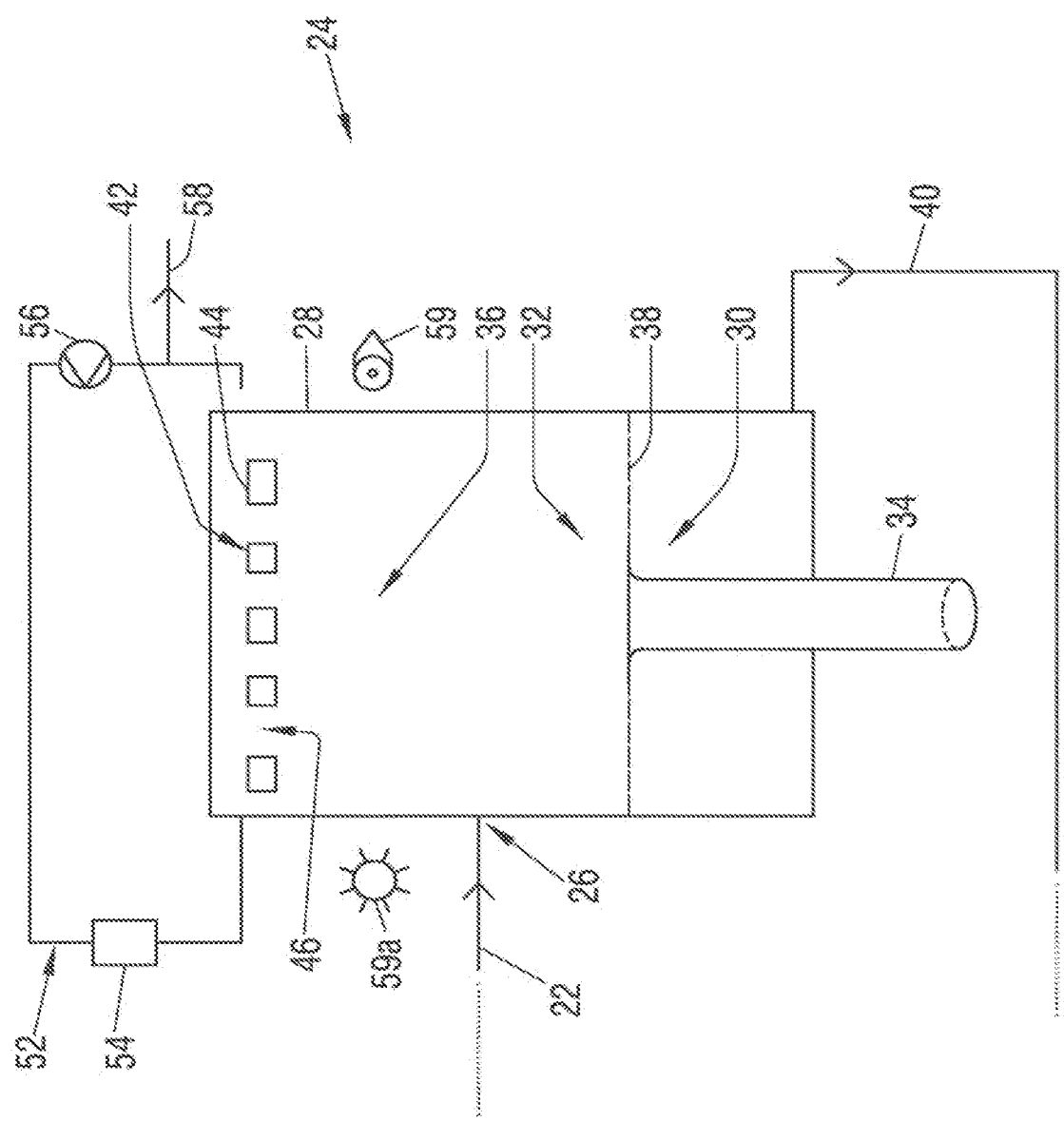
FIG. 7 shows a schematic cross-sectional view of the wash column apparatus in accordance with a further embodiment of the present invention.

The wash column apparatus 24 shown in FIG. 7 is constructed like that of FIG. 2 except that the metal plates 44 are not rounded at their lower ends and in that no channels for heat transfer medium are provided at the lower end of the metal plates 44.

Figure 8:
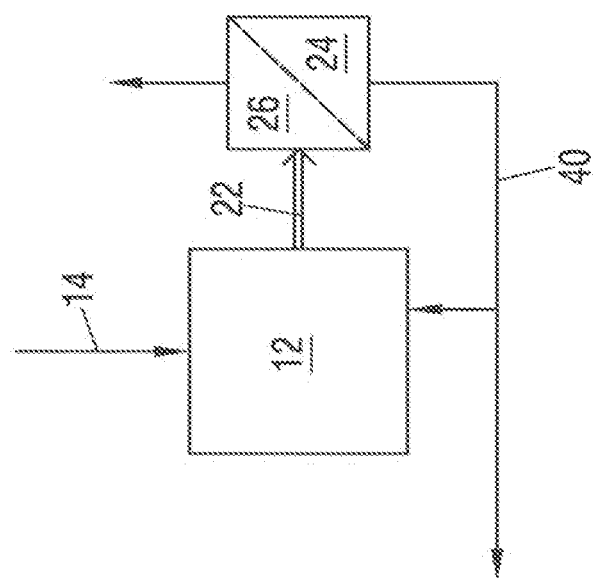
FIG. 8 shows a schematic view of a one-stage suspension crystallization plant in accordance with the present invention.

In FIG. 8 a one-stage suspension crystallization plant in accordance with the present invention is shown, which is identical with that shown in FIG. 1 except that the second crystallization stage 68 is absent.

Figure 9:
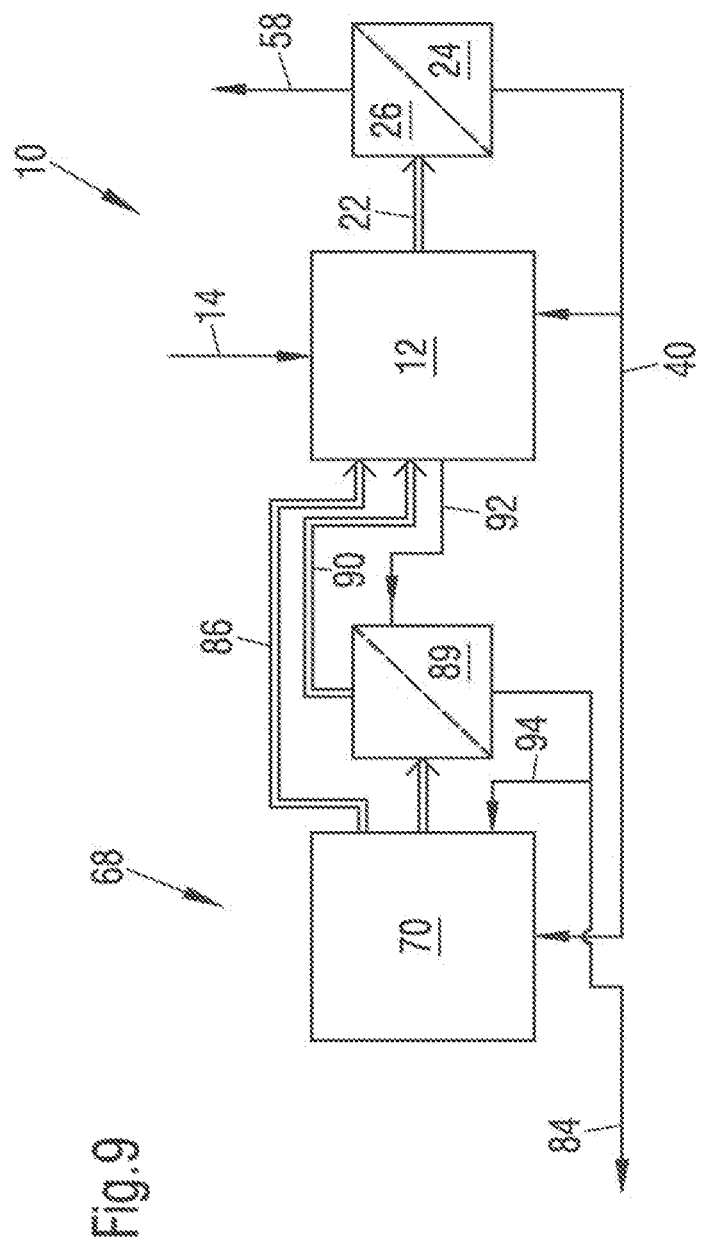
FIG. 9 shows a schematic view of a two-stage suspension crystallization plant with a thickener in accordance with the present invention.

FIG. 9 shows a schematic view of a two-stage suspension crystallization plant with wash column thickener in accordance with the present invention. This plant is identical to that shown in FIG. 1 except that a wash column thickener 89 is provided between the second crystallization block 70 and the first crystallization block 12. The wash column thickener 89 is constructed as the wash column apparatus 24 except that the circulation conduit is not closed, but open leading via line 90 to the first crystallization block 12, from which a transport medium line 92 returns back to the upper part of the wash column thickener, thus closing the circulation conduit 90, 92. The function of the wash column thickener 89 is to separate the mother liquor from the crystal suspension mixture formed in the second crystallizer 70. As described above for the wash column apparatus 24, during the operation of the wash column thickener 89 a crystal bed is formed in the upper part of the cylindrical vessel of the wash column thickener. The surface part of the crystal bed is then dispersed in the transport medium introduced via line 92 into the cylindrical vessel of the wash column thickener so as to form the concentrated, i.e. thickened, crystal suspension mixture, which is then led via the circulation conduit 90 into the first crystallization block 12. Concentrated mother liquor is discharged from the plant via discharge line 84, wherein a part of the concentrated mother liquor may be transported into the second crystallization block 70 via the return line 94. In order to discharge crystal free mother liquor, preferably filter (not shown) are provided in the wash column thickener 89 and/or in the discharge line 84.

The invention claimed is:

1. A wash column apparatus for use in a suspension crystallization process configured to separate crystals from a crystal suspension mixture composed of crystals and mother liquor, the wash column apparatus comprising:
    a cylindrical vessel, the cylindrical vessel comprising:
    a piston with a piston head and a piston rod, the piston being arranged reciprocatingly movable in the cylindrical vessel, the piston bounding above the piston head a wash chamber inside the cylindrical vessel, and the piston head comprising at least one filter,
    an inlet configured to supply a crystal suspension mixture composed of crystals and mother liquor into the cylindrical vessel,
    a first outlet configured to discharge mother liquor from the cylindrical vessel,
    a second outlet configured to discharge crystals or crystal melt from the cylindrical vessel,
    a circulation conduit configured to circulate melt arranged outside the cylindrical vessel, the circulation conduit being in communication with the wash chamber, and
    a static grid element arranged in the wash chamber configured to restrict movement of a crystal bed that has been compacted in the wash chamber by the piston and configured to direct a wash liquid entering into the cylindrical vessel from the circulation conduit so as to homogeneously distribute the wash liquid over an entire cross-section of the wash column,
    the static grid element comprising at least one element, which is at least substantially vertically extending, and at least two vertically extending cavities, which are at least substantially vertically extending, the at least two cavities, which are at least substantially vertically extending, being open at upper and lower ends thereof, but otherwise at least partially closed, substantially vertically extending meaning that a longitudinal axis of the at least one element and of the at least two cavities extends at an angle of 0 to 60° to a vertical direction,
    wherein a second inlet leads from the cylindrical vessel into the circulation conduit for discharging a part of the crystals or crystal melt thereof into the circulation conduit and a third outlet leads from the circulation conduit into the cylindrical vessel for partially reintroducing the circulated melt as reintroduced wash liquid into the cylindrical vessel so as to flow through the static grid element to the crystal bed,
    wherein the second inlet and the third outlet are arranged at a downstream side of the static grid element, the downstream side being a side of the static grid element that is opposite to a side of the static grid element at which the piston performs a compression stroke,
    wherein a heating element is provided in the circulation conduit to control a temperature of the circulated melt, and
    wherein dimensions and cross-sectional areas of the cavities are adjusted so as to allow the formation and maintenance of the crystal bed and to homogeneously distribute the reintroduced wash liquid over the entire cross-section of the wash column.

2. The wash column apparatus in accordance with claim 1, wherein the at least two cavities, which are at least substantially vertically extending, have a rectangular cross-section, a hexagonal cross-section, a circular cross-section or an annular cross-section.

3. The wash column apparatus in accordance with claim 1, wherein the static grid element comprises at least three vertically extending cavities being open at upper and lower ends thereof, but otherwise closed.

4. The wash column apparatus in accordance with claim 1, wherein the static grid element comprises at least two vertically arranged parallel plates with at least one cavity formed between each of adjacent plates, wherein the at least one cavity is open at its upper and lower ends, but otherwise closed.

5. The wash column apparatus in accordance with claim 4, wherein the static grid element comprises 2 to 20 plates arranged vertically and in parallel.

6. The wash column apparatus in accordance with claim 4, wherein cuboidal cavities are formed between each of the adjacent plates of the static grid element, the cuboidal cavities being open at upper and lower ends thereof, but otherwise closed.

7. The wash column apparatus in accordance with claim 6, wherein the static grid element includes an open cross-sectional area, which is the ratio of the sum of cross-sectional areas of the cuboidal cavities of the static grid element divided by a total cross-sectional area of the static grid element, and is 10 to 90%.

8. A method for separating crystals from a crystal suspension mixture composed of crystals and mother liquor comprising the step of supplying a crystal suspension mixture composed of crystals and mother liquor to the inlet of a wash column apparatus in accordance with claim 1.

9. A method for thickening a crystal suspension mixture composed of crystals and mother liquor, comprising:
    supplying a crystal suspension mixture composed of crystals and mother liquor to the inlet of a wash column apparatus in accordance with claim 1.

10. The wash column apparatus in accordance with claim 2, wherein the static grid element comprises at least three vertically extending cavities, which are open at upper and lower ends thereof, but otherwise closed.

11. The wash column apparatus in accordance with claim 5, wherein cuboidal cavities are formed between each of the adjacent plates of the static grid element, wherein the cuboidal cavities are open at upper and lower ends thereof, but otherwise closed.

12. The wash column apparatus in accordance with claim 4, wherein the static grid element comprises 4 to 7 plates, which are arranged vertically and in parallel.

\* \* \* \* \*